(12) United States Patent
Fukumoto et al.

(10) Patent No.: US 10,696,267 B2
(45) Date of Patent: Jun. 30, 2020

(54) GAS GENERATOR

(71) Applicant: DAICEL CORPORATION, Osaka-shi, Osaka (JP)

(72) Inventors: Kenji Fukumoto, Tatsuno (JP); Teppei Hanano, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 105 days.

(21) Appl. No.: 16/096,047

(22) PCT Filed: Apr. 28, 2017

(86) PCT No.: PCT/JP2017/016926
§ 371 (c)(1),
(2) Date: Oct. 24, 2018

(87) PCT Pub. No.: WO2017/203934
PCT Pub. Date: Nov. 30, 2017

(65) Prior Publication Data
US 2019/0126885 A1    May 2, 2019

(30) Foreign Application Priority Data

May 23, 2016  (JP) ................................ 2016-102061

(51) Int. Cl.
*B60R 21/264*    (2006.01)
*B01J 7/00*    (2006.01)
(Continued)

(52) U.S. Cl.
CPC ............... *B60R 21/264* (2013.01); *B01J 7/00* (2013.01); *B60R 21/262* (2013.01);
(Continued)

(58) Field of Classification Search
CPC . B60R 21/2171; B60R 21/264; B60R 21/262; B60R 2021/26041;
(Continued)

(56) References Cited

U.S. PATENT DOCUMENTS 5,350,190 A * 9/1994 Szigethy ................ B60Q 5/003
200/61.55
5,380,037 A * 1/1995 Worrell .................. B60Q 5/003
200/61.55
(Continued)

FOREIGN PATENT DOCUMENTS

JP    2007-131254 A    5/2007
JP    2007-302230 A    11/2007
(Continued)

*Primary Examiner* — Paul N Dickson
*Assistant Examiner* — Timothy Wilhelm
(74) *Attorney, Agent, or Firm* — Birch, Stewart, Kolasch & Birch, LLP (57) ABSTRACT

The present invention provides a gas generator, including:
an ignition device being disposed at a first end of a cylindrical housing main body portion, a diffuser portion being provided with a gas discharge port and closing a second end thereof which is axially opposite to the first end;
a combustion chamber being present in an internal space of the cylindrical housing main body portion;
a cup-shaped member partitioning the combustion chamber and the diffuser portion,
a bottom surface and an opening of the cup-shaped member being located on the side of the first end and the second end of the cylindrical housing main body portion respectively, and
a first gap being formed between the circumferential wall of the cup-shaped member and an inner wall surface of the cylindrical housing main body portion;
a cylindrical filter being disposed in a space surrounded by the cup-shaped member and the diffuser portion, and
(Continued)

a first end surface of the cylindrical filter being abutted against the bottom surface of the cup-shaped member, and a second end surface thereof on the opposite side being abutted against a closed end surface of the diffuser portion; and the communication hole of the cup-shaped member being formed at a position closer to the first end surface of the cylindrical filter to face the first gap, and the gas discharge port of the diffuser portion being formed closer to the second end surface of the cylindrical filter.

10 Claims, 4 Drawing Sheets

(51) Int. Cl.
  *B60R 21/262* (2011.01)
  *B60R 21/26* (2011.01)
(52) U.S. Cl.
  CPC ............ *B60R 2021/26011* (2013.01); *B60R 2021/26029* (2013.01); *B60R 2021/26041* (2013.01)
(58) Field of Classification Search
  CPC . B60R 2021/26029; B60R 2021/26011; B60R 21/2346; B60R 21/2176; B01J 7/00
  See application file for complete search history.

(56) References Cited

U.S. PATENT DOCUMENTS

| | | | | |
|---|---|---|---|---|
| 5,470,100 | A * | 11/1995 | Gordon | B60R 21/217 280/728.2 |
| 5,775,725 | A * | 7/1998 | Hodac | B60Q 5/003 280/728.2 |
| 6,092,832 | A * | 7/2000 | Worrell | B60R 21/2035 280/728.2 |
| 6,299,201 | B1 * | 10/2001 | Fujita | B60Q 5/003 200/61.55 |
| 6,457,379 | B1 * | 10/2002 | Mirone | B60Q 5/003 200/61.54 |
| 6,474,685 | B1 | 11/2002 | Meixner et al. | |
| 7,059,631 | B2 * | 6/2006 | Schorle | B60R 21/2037 280/728.2 |
| 7,343,862 | B2 * | 3/2008 | McCormick | B60R 21/261 102/530 |
| 7,390,019 | B2 * | 6/2008 | Gotoh | B60R 21/2644 280/736 |
| 7,654,565 | B2 * | 2/2010 | McCormick | B60R 21/2644 280/736 |
| 7,784,829 | B2 * | 8/2010 | Hirooka | B60R 21/2644 280/736 |
| 7,806,954 | B2 * | 10/2010 | Quioc | B60R 21/2644 102/202.14 |
| 7,950,691 | B1 * | 5/2011 | Mayville | B60R 21/261 102/531 |
| 8,236,112 | B2 * | 8/2012 | Yamazaki | B60R 21/2644 149/2 |
| 8,302,992 | B2 * | 11/2012 | Hanano | B60R 21/262 102/531 |
| 8,376,400 | B2 * | 2/2013 | Mason | B60R 21/2644 280/736 |
| 8,469,398 | B2 * | 6/2013 | Numoto | B60R 21/263 280/736 |
| 8,764,054 | B2 * | 7/2014 | Mayville | B60R 21/2644 280/736 |
| 9,950,688 | B2 * | 4/2018 | Yamashita | B60R 21/261 |
| 9,994,189 | B2 * | 6/2018 | Imoto | B60R 21/2644 |
| 10,046,727 | B2 * | 8/2018 | Hanano | B60R 21/261 |
| 10,046,728 | B2 * | 8/2018 | Bierwirth | B60R 21/26 |
| 2004/0041373 | A1 * | 3/2004 | Helmstetter | B60R 21/217 280/728.2 |
| 2004/0239080 | A1 * | 12/2004 | Berrahou | B60R 21/203 280/728.2 |
| 2007/0248511 | A1 | 10/2007 | Mason et al. | |
| 2008/0078486 | A1 * | 4/2008 | Khandhadia | C06B 31/08 149/109.2 |
| 2008/0264022 | A1 | 10/2008 | Zengerle et al. | |
| 2010/0186617 | A1 | 7/2010 | Zhang | |
| 2010/0290959 | A1 | 11/2010 | Yamazaki et al. | |
| 2011/0187088 | A1 | 8/2011 | Hanano et al. | |
| 2012/0042801 | A1 * | 2/2012 | Sasamoto | B60R 21/2644 102/530 |
| 2012/0048137 | A1 * | 3/2012 | Hagihara | B60R 21/2644 102/530 |
| 2014/0239623 | A1 * | 8/2014 | Tokuda | B60R 21/272 280/737 |
| 2017/0151543 | A1 * | 6/2017 | Noda | B60R 21/264 |
| 2018/0154859 | A1 * | 6/2018 | Kubo | B60R 21/264 |
| 2018/0200774 | A1 * | 7/2018 | Nakatsuka | B21D 41/04 |
| 2018/0304848 | A1 * | 10/2018 | Imai | B60R 21/2644 |

FOREIGN PATENT DOCUMENTS

| | | |
|---|---|---|
| JP | 2010-264773 A | 11/2010 |
| JP | 2010-540336 A | 12/2010 |
| JP | 2011-157025 A | 8/2011 |
| JP | 2014-184427 A | 10/2014 |

* cited by examiner

GAS GENERATOR

TECHNICAL FIELD

The present invention relates to a gas generator used for an airbag apparatus mounted to an automobile.

DESCRIPTION OF RELATED ART

Some gas generators which include a gas generating agent as a gas generating source, have a filter for filtering and cooling a combustion gas.

JP2014-184427A discloses an invention of a hybrid gas generator. Disclosed is a structure in which a filter 60 is provided in a vicinity of a gas outlet inside a pressurized housing 22 charged with a pressurized gas, and in a vicinity of a diffuser portion 150 serving as a gas discharging port.

In FIG. 8, the filter 60 is held between a cup-shaped member 170 and a porous plate member 180 and is fixed thereby. A communication hole 173 for introducing a gas is formed in a circumferential wall of the cup-shaped member 170. The perforated plate member 180 has a large number of communication holes 183. A gas enters the filter 60 from an outer circumferential surface thereof via the communication hole 173 and is then discharged from an end surface (a first end surface) 61.

U.S. Pat. No. 6,474,685B discloses an invention of a pyrotechnic gas generator. A combustion chamber 21 filled with a gas generating agent 25 is separated from a filter chamber 29 accommodating a filter 71 by a wall 33 provided with an opening 37.

It is disclosed that an approximately cone-shaped filter 42 is disposed inside the combustion chamber 21, and a combustion gas flows in from an inclined surface of the cone shape, passes through the opening 37 of the wall 33, enters the filter chamber 29, and is discharged through the filter 71 in a radial direction.

JP2007-131254A discloses an invention of a pyrotechnic gas generator. The gas generator according to JP2007-131254A has annular filters 13a and 13b at two locations, and it is described that the following advantageous effect is obtained thereby: "After passing through the filters 13a and 13b, the combustion gas once again flows out of the opposite surfaces of the filters. Accordingly, the combustion gas passes through a single filter twice and further strikes the inner wall surface of the housing to cause combustion residues to be collected, which enhances a collecting efficiency for combustion residues." (Paragraph 0045).

SUMMARY OF INVENTION

Embodiment 1 of the present invention (hereinafter, referred to as a "Embodiment 1") is a gas generator, including:

a cylindrical housing including a cylindrical housing main body portion and a diffuser portion;

an ignition device being disposed at a first end of the cylindrical housing main body portion, the diffuser portion being provided with a gas discharge port and closing a second end thereof on an axially opposite side to the first end;

a combustion chamber which contains a gas generating agent being present in an internal space of the cylindrical housing main body portion;

a cup-shaped member partitioning the combustion chamber and the diffuser portion, the cup-shaped member having a bottom surface, a circumferential wall having a communication hole, and an opening, the cup-shaped member being disposed such that, the bottom surface is located on the side of the first end of the cylindrical housing main body portion, the opening is located on the side of the second end thereof, and the circumferential wall radially outwardly opposes an inner wall surface of the cylindrical housing main body portion to form therebetween a first gap communicating the combustion chamber with the diffuser portion, a cylindrical filter being disposed in a space surrounded by the cup-shaped member and the diffuser portion, the cylindrical filter being disposed such that a first end surface thereof is abutted against the bottom surface of the cup-shaped member, a second end surface thereof on the opposite side to the first end surface is abutted against a closed end surface of the diffuser portion and a central axis of the cylindrical filter is aligned with a long axis direction of the cylindrical housing, and the communication hole of the cup-shaped member being formed at a position closer to the first end surface of the cylindrical filter to face the first gap, and the gas discharge port of the diffuser portion being formed closer to the second end surface of the cylindrical filter.

Embodiment 2 of the present invention (hereinafter, referred to as a "Embodiment 1") is a gas generator, including:

a cylindrical housing including a cylindrical housing main body portion and a diffuser portion;

an ignition device being disposed at a first end of the cylindrical housing main body portion, a diffuser portion being provided with a gas discharge port and closing a second end thereof on an axially opposite side to the first end;

a combustion chamber which contains a gas generating agent being present in an internal space of the cylindrical housing main body portion;

a cup-shaped member partitioning the combustion chamber and the diffuser portion, the cup-shaped member having a bottom surface, a circumferential wall having a communication hole, and an opening, the cup-shaped member being disposed such that, the bottom surface is located on the side of the first end of the cylindrical housing main body portion, the opening is located on the side of the second end thereof, and the circumferential wall radially outwardly opposes an inner wall surface of the cylindrical housing main body portion to form therebetween a first gap communicating the combustion chamber with the diffuser portion, a cup-shaped filter having a bottom surface, a circumferential wall and an opening and being disposed in a space surrounded by the cup-shaped member and the diffuser portion, the cup-shaped filter being disposed such that the bottom surface of the cup-shaped filter is abutted against the bottom surface of the cup-shaped member, an end surface of the opening of the cup-shaped filter is abutted against a closed end surface of the diffuser portion, and a central axis of the cup-shaped filter is aligned with a long axis direction of the cylindrical housing, and the communication hole of the cup-shaped member being formed at a position closer to the bottom surface of the cup-shaped filter to face the first gap, and the gas discharge port of the diffuser portion being formed closer to the opening of the cup-shaped filter.

BRIEF DESCRIPTION OF THE DRAWINGS

The present invention will become more fully understood from the detailed description given hereinbelow and the accompanying drawings which are given by way of illustration only, and thus are no limitative of the pre sent invention and wherein:

FIG. 2 shows, in (a), a cross-sectional view of a cup-shaped member used in FIG. 1 and, in (b) to (e), cross-sectional views of cup-shaped members in other shapes;

FIG. 4 shows, in (a), a partial cross-sectional view in the direction of the axis X of a gas generator in which a cup-shaped filter having a different shape from that shown in FIG. 1, and in (b), a partial cross-sectional view in the direction of the axis X of a gas generator in which a cup-shaped filter having a different shape from that shown in (a); and FIG. 5 shows, in (a), a partial cross-sectional view of an embodiment in which a diameter expansion inhibiting member is disposed in the gas generator shown in FIG. 1, and in (b) and (c), partial cross-sectional views of embodiments in which a diameter expansion inhibiting member different from that shown in (a) is disposed.

DETAILED DESCRIPTION OF INVENTION

Since the gas generator according to JP2014-184427A is a hybrid type, a rupturable plate (a second rupturable plate) 58 is necessary, and when the filter is disposed inside the pressurized gas chamber housing, a filter holding structure such as that described above is required. Therefore, the structure is complicated and there is room for improvement in terms of simplification.

Since many filters and parts are used in U.S. Pat. No. 6,474,685B, the structure is complicated and is not suitable to obtain a weight reduction.

In order to obtain the advantageous effect described in Paragraph 0045 of JP2007-131254A, the filters have to be disposed at two locations, a combination of a cylindrical partition wall 19 and a cylindrical partition wall 18 is necessary. Further, with the annular filters 13a and 13b, a cooling effect of the combustion gas is not sufficient because the combustion gas passes through a narrow range of the respective filters twice.

The present invention provides a gas generator with a simple and lightweight structure, which exhibits improved cooling and filtering effects.

A cylindrical housing used in the present invention is made of a metal such as iron or stainless steel and includes a cylindrical housing main body portion and a diffuser portion. The cylindrical housing main body portion and the diffuser portion may be joined together by welding or may be integrally molded in advance.

As an ignition device, an electric igniter used in a known gas generator or a combination of an electric igniter and a transfer charge can be used. As the transfer charge, a known gas generating agent, black powders, and the like can be used.

A gas discharge port of the diffuser portion is formed in plurality on a circumferential wall of the cylindrical housing (the diffuser portion) and is closed by a closing member such as a seal tape. As a gas generating agent filled in a combustion chamber, a gas generating agent used in a known gas generator is used.

The combustion chamber and the diffuser portion are partitioned by a cup-shaped member. Here, "partitioned" indicates that, although a space of the combustion chamber and an internal space of the diffuser portion are separated by the cup-shaped member, a gas discharge passage from the combustion chamber to the diffuser portion is secured. The gas discharge passage from the combustion chamber to the diffuser portion is a gas discharge passage including the combustion chamber, a first gap, a communication hole and the diffuser portion.

The cup-shaped member needs only to be disposed to form the first gap between the cup-shaped member and an inner wall surface of the cylindrical housing main body, and the first gap communicates the combustion chamber with the diffuser portion. For example, the cup-shaped member may be fixed in following arrangements:

(I) An arrangement in which an annular protrusion (an annular stepped surface) protruding inward is formed between the cylindrical housing main body portion and the diffuser portion, and an end surface of an opening of the cup-shaped member is abutted against the annular protrusion (the annular stepped surface)

(II) In the arrangement (I) described above, with the use of a cup-shaped member having an enlarged diameter portion at the opening, the enlarged diameter portion is abutted against the annular protrusion (the annular stepped surface);

(III) In the arrangement (I) described above, with the use of a cup-shaped member which an outer diameter (d1) of a bottom surface and an outer diameter (d2) of an opening satisfy a relationship of d2>d1 and a circumferential wall from the bottom surface to the opening is an inclined surface, an end surface of the opening is abutted against the annular protrusion (the annular stepped surface);

(IV) An arrangement in which an inner diameter (D1) of the cylindrical housing main body and an inner diameter (D2) of the diffuser portion satisfy a relationship of D1>D2 so as to form an annular stepped surface at a boundary thereof and the opening of the cup-shaped member in the shape of (I), (II) or (III) is abutted against the annular stepped surface;

(V) An arrangement in which, with the use of a cup-shaped member having the enlarged diameter portion at the opening and a folded portion folded from the enlarged diameter portion toward a bottom surface, the folded portion of the cup-shaped member is press-fitted into an inner wall surface of the cylindrical housing main body portion by adjusting an outer diameter of the folded portion and an inner diameter of the cylindrical housing main body portion; and (VI) An arrangement in which, with the use of a cup-shaped member in that the outer diameter (d1) of the bottom surface and the outer diameter (d2) of the opening satisfy a relationship of d2>d1, the circumferential wall from the bottom surface to the opening is the inclined surface and the folded portion folded from the enlarged diameter portion toward the bottom surface is further provided, the folded portion of the cup-shaped member is press-fitted into the inner wall surface of the cylindrical housing main body portion by adjusting an outer diameter of the folded portion and an inner diameter of the cylindrical housing main body portion.

As typically described in Embodiment 1, in the gas generator according to the present invention, a combustion gas generated by combustion of the gas generating agent inside the combustion chamber passes through the combustion chamber, the first gap and the vicinity of the first end surface of the cylindrical filter via the communication hole and then enters the diffuser portion. Subsequently, after passing through the vicinity of the second end surface of the same cylindrical filter, the combustion gas is discharged from the gas discharge port.

By the gas generator according to the present invention which operates in this manner, the following advantageous effects (i) to (iii) are obtained:

(i) By causing the combustion gas to pass through the same filter twice, a cooling effect and a filtering effect are enhanced as compared to the case in which a combustion gas passes through a filter once (for example, JP2014-184427A and U.S. Pat. No. 6,474,885B). An amount of a filter and the number of parts are reduced as compared to the case in which filters are disposed separately at two locations (for example, JP2007-131254A);

(ii) Further, since the filter is a cylindrical filter and the cylindrical filter is disposed such that a central axis thereof is aligned in a direction of a long axis of the cylindrical housing, the combustion gas passes through the cylindrical filter in the part closer to the first end at the time of the first passing, and the combustion gas passes through the cylindrical filter in the part closer to the second end at the time of the second passing. Therefore, the combustion gas is likely to be discharged more swiftly as compared to the embodiment in JP2007-131254A.

(iii) Further, since the combustion gas more easily comes into contact with an irregular surface of the cylindrical filter and an area of the irregular surface is large, combustion residues contained in the combustion gas more readily adhere to the cylindrical filter and are more readily collected by the cylindrical filter as compared to the embodiment in JP2007-131254A.

It is preferable in the gas generator according to Embodiment 1 that a circumferential wall of the cylindrical filter includes a thicker-walled portion on the side of the first end surface and a thinner-walled portion on a side of the second end surface, and only the thicker-walled portion faces the communication hole of the cup-shaped member.

The combustion gas generated by combustion of the gas generating agent inside the combustion chamber passes through the combustion chamber, the first gap and the vicinity of the first end surface of the cylindrical filter via the communication hole and then enters the diffuser portion. Accordingly, the combustion gas which has passed the vicinity of the first end surface of the cylindrical filter always passes through the thicker-walled portion of the cylindrical filter, which enhances a cooling effect and a filtering effect.

Thicknesses of the thicker-walled portion and the thinner-walled portion are not particularly limited, however, for example, a thickness of thicker-walled portion/a thickness of thinner-walled portion can be in a range of 1.2 to 3.0.

A gas generator according to Embodiment 2 differs from the gas generator according to Embodiment 1 in that a cup-shaped filter is used as the filter. The communication hole of the cup-shaped member may only face a circumferential wall of the cup-shaped filter or may face both the circumferential wall and a bottom surface of the cup-shaped filter. The gas generator according to Embodiment 2 operates in the same manner and produces the same advantageous effects as the gas generator according to Embodiment 1.

It is preferable in the gas generator according to Embodiment 2 that a thickness of the bottom surface of the cup-shaped filter is greater than a thickness of the circumferential wall of the cup-shaped filter and greater than an inner diameter of the communication hole of the cup-shaped member, and only the bottom surface of the cup-shaped filter faces the communication hole of the cup-shaped member.

A combustion gas generated by combustion of the gas generating agent inside the combustion chamber passes through the combustion chamber, the first gap and the bottom surface of the cup-shaped filter via the communication hole, and then enters the diffuser portion. When the combustion gas enters the diffuser portion in this manner, the combustion gas passes through the bottom surface of the cup-shaped filter, which is thicker than the circumferential wall, and thereby, a cooling effect and a filtering effect are enhanced.

It is preferable in the gas generator according to Embodiment 1 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, and an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface (Embodiment 3).

Further, it is preferable in the gas generator according to Embodiment 2 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, and an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening (Embodiment 4).

In the gas generators according to Embodiment 3 and the Embodiment 4, an outer diameter of the cup-shaped member on the side of the opening is larger than an outer diameter of the bottom surface thereof. As such a cup-shaped member, the cup-shaped members used in the arrangements (II), (III), (V), and (VI) described above can be used.

The annular stepped surface may be the annular protrusion according to the arrangement (I) or the annular stepped surface according to the arrangement (IV) described above.

In the gas generator according to Embodiment 3 or Embodiment 4, dimensions of the cup-shaped member and the annular stepped surface are adjusted such that, when the cylindrical filter or the cup-shaped filter is disposed, a second gap is formed between the gas discharge port and the outer surface of the circumferential wall of the cylindrical filter on the side of the second end surface or the outer surface of the circumferential wall of the cup-shaped filter on the side of the opening. With the presence of the second gap, the combustion gas in the diffuser portion passes through the entire portion, in the filter, facing the second gap, enters the second gap and then is discharged from the gas discharge port, which enhances a cooling effect and a filtering effect of the filter.

It is preferable in the gas generator according to Embodiment 3 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface, and with respect to an area (A1) where the circumferential wall of the cylindrical filter and the circumferential wall of the cup-shaped member are abutted against each other and an area (A2) where the circumferential wall of the cylindrical filter faces the second gap, A2 is in a range of more than 50% to 80% when a total area of A1 and A2 is 100%.

It is preferable in the gas generator according to Embodiment 4 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening, and with respect to an area (A1) where the circumferential wall of the cup-shaped filter and the circumferential wall of the cup-shaped member are abutted against each other and an area (A2) where the circumferential wall of the cup-shaped filter faces the second gap, A2 is in a range of more than 50% to 80% when a total area of A1 and A2 is 100%.

When A1 and A2 satisfy the relationship described above, advantageous effects (ii) and (iii) particularly among the advantageous effects (i) to (iii) described above become more pronounced. When the total area of A1 and A2 is 100%, an area of A2 is more preferably within a range of 60% to 80% and even more preferably within a range of 60% to 75%.

It is preferable in the gas generator according to Embodiment 3 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface, and a diameter expansion inhibiting member is disposed between the circumferential wall of the cylindrical filter on the side of the second end surface and an inner circumferential wall surface of the diffuser portion on the side of a closed end surface, and the diameter expansion inhibiting member blocks a diameter expansion at the circumferential wall of the cylindrical filter on the side of the second end surface.

It is preferable in the gas generator according to Embodiment 4 that an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening, and a diameter expansion inhibiting member is disposed between the circumferential wall of the cup-shaped filter on the side of the opening and an inner circumferential wall surface of the diffuser portion on the side of a closed end surface, and the diameter expansion inhibiting member blocks a diameter expansion at the circumferential wall of the cup-shaped filter on the side of the opening.

When the combustion gas entering the diffuser portion passes through the cylindrical filter or the cup-shaped filter and is discharged from the gas discharge port, the cylindrical filter or the cup-shaped filter on the side of the closed end surface of the diffuser portion may deform radially outward under pressure during passage of the combustion gas.

If the filter deforms to expand radially in this manner, the second gap is decreased, which may deteriorate the cooling effect and the filtering effect. However, an arrangement of the diameter expansion inhibiting member prevents the occurrence of such problems.

The gas generator according to present invention has a simple and lightweight structure and exhibits cooling and filtering effects for a combustion gas.

The gas generator according to the present invention is used as a gas generator for an airbag apparatus mounted on an automobile.

DESCRIPTION OF EMBODIMENTS (1) Gas Generator According to Embodiment 1

Figure 1:
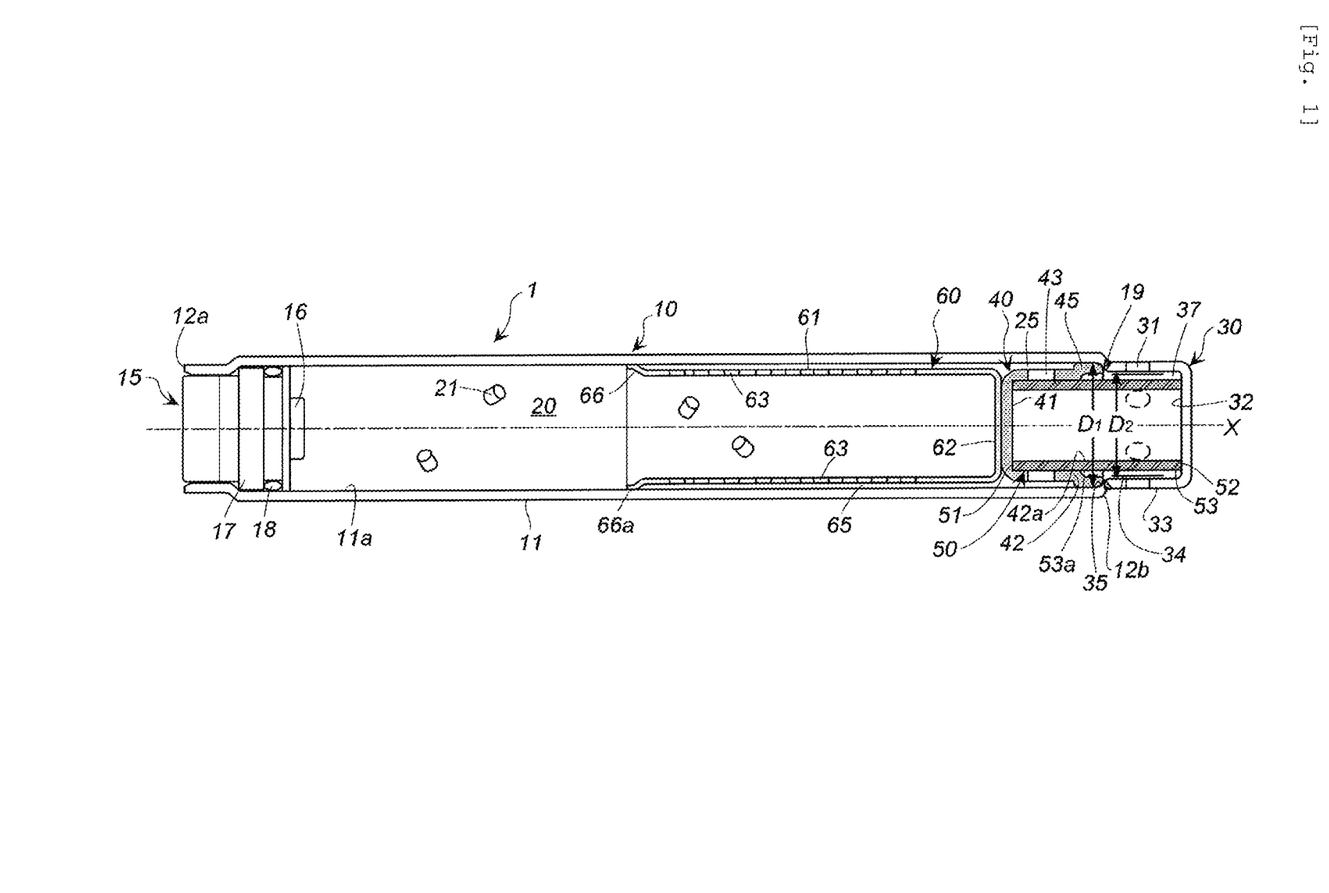
FIG. 1 is a cross-sectional view in a direction of an axis X of a gas generator according to the present invention.

In a gas generator 1 shown in FIG. 1, a cylindrical housing 10 which is an outer shell container includes a cylindrical housing main body portion 11 and a diffuser portion 30. The cylindrical housing main body portion 11 and the diffuser portion 30 are made of a metal such as stainless steel.

An igniter 15 is installed at a first end 12a of the cylindrical housing main body portion 11. In the igniter 15, an igniter main body having an ignition portion 16 is fixed to an igniter collar 17. When necessary, a known transfer charge can be used therewith. An O-ring 18 for moisture proofing is disposed between the igniter collar 17 and an inner wall surface 11a of the cylindrical housing main body portion 11.

A second end 12b on the opposite side in a direction of an axis X to the first end 12a of the cylindrical housing main body portion 11 is closed by the diffuser portion 30 provided with gas discharge ports 31.

The diffuser portion 30 has a closed end surface 32 and a circumferential wall 33. In the embodiment shown in FIG. 1, the cylindrical housing main body portion 11 and the diffuser portion 30 are welded at a welded portion 19.

A plurality of the gas discharge ports 31 are formed equidistantly in a circumferential direction and are closed from the inside with an aluminum seal tape 34.

In the embodiment shown in FIG. 1, an annular stepped surface 35 is formed in a boundary portion between the cylindrical housing main body portion 11 and the diffuser portion 30. The annular stepped surface 35 is formed because an inner diameter (D1) of the cylindrical housing main body portion 11 and an inner diameter (D2) of the diffuser portion 30 satisfy D1>D2.

A large portion of the cylindrical housing main body portion 11 and the diffuser portion 30 respectively have a constant inner diameter in FIG. 1. However, when the inner diameters thereof are not constant, D1 and D2 are an inner diameter on the side of the first end 12a and an inner diameter on the side of the second end 12b respectively, which are contiguous with an annular step. In other words, when the respective inner diameters are not constant, for example in FIG. 1, D1 is an inner diameter of a portion adjacent to the left of the annular stepped surface 35 in the housing main body portion and D2 is an inner diameter of a portion adjacent to the right of the annular stepped surface 35 in the diffuser portion 30.

An internal space of the cylindrical housing main body portion 11 is a combustion chamber 20 containing a gas generating agent 21. When necessary, a retainer for adjusting a capacity of the combustion chamber 20 may be disposed inside the combustion chamber 20 in accordance with a filling amount of the gas generating agent 21.

Figure 2:
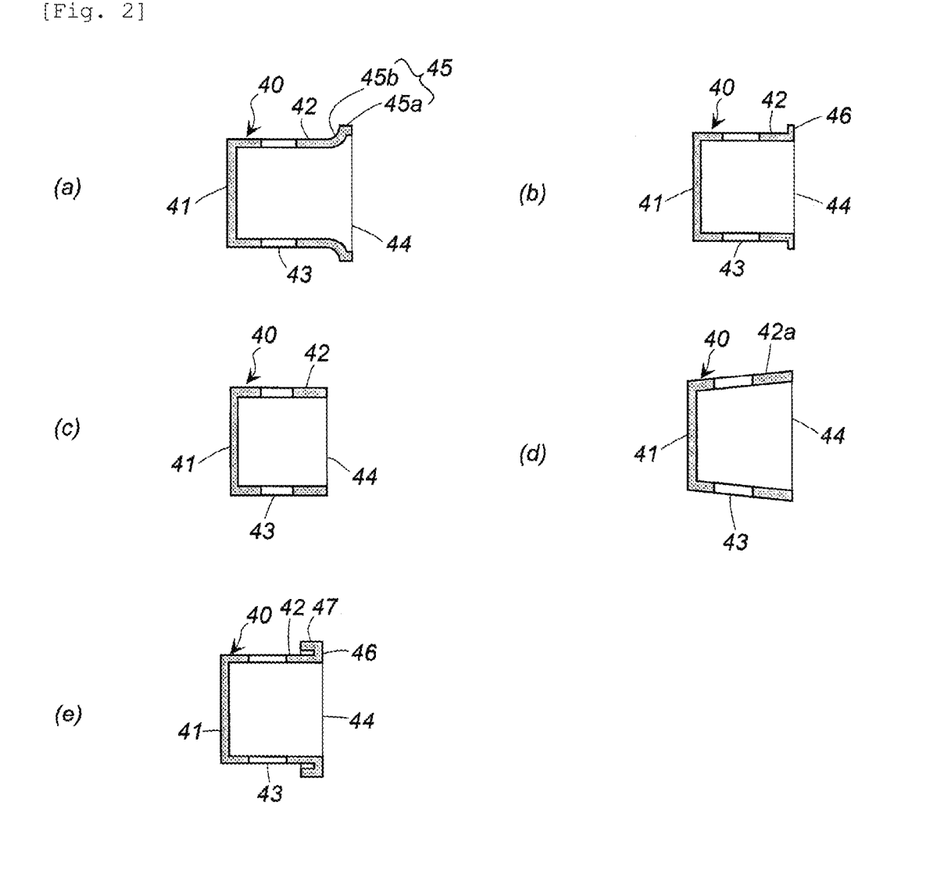

The combustion chamber 20 and the diffuser portion 30 are partitioned by a cup-shaped member 40. The cup-shaped member 40 is made of iron, stainless steel, or the like and, as shown in FIG. 1 and in (a) in FIG. 2, the cup-shaped member 40 has a bottom surface 41, a circumferential wall 42 formed with communication holes 43, and an opening 44. A plurality of the communication holes 43 are formed equidistantly in a circumferential direction.

An end surface of the opening 44 of the cup-shaped member 40 has an enlarged diameter portion 45 that expands outward. The enlarged diameter portion 45 includes an annular enlarged diameter portion 45a extended in a same direction as the circumferential wall 42 and an annular inclined surface 45b located between the annular enlarged diameter portion 45a and the circumferential wall 42. An outer diameter of the annular enlarged diameter portion 45a is larger than an outer diameter of the circumferential wall 42. The cup-shaped member 40 is press-fitted into the housing main body portion 11 by adjusting a dimension of the outer diameter of the enlarged diameter portion 45 and a dimension of the inner diameter of the cylindrical housing main body portion 11.

As a shape of the cup-shaped member 40, various shapes can be adopted in association with shapes of the cylindrical housing main body portion 11 and the diffuser portion 30.

(b) in FIG. 2 shows a cup-shaped member in which a portion corresponding to the enlarged diameter portion 45 in (a) in FIG. 2 is a general flange 46.

(c) in FIG. 2 shows a cup-shaped member in which the enlarged diameter portion 45 shown in (a) in FIG. 2 is not provided.

(d) FIG. 2 shows a cup-shaped member in which an outer diameter (d1) of the bottom surface 41 and an outer diameter (d2) of the opening 44 satisfy d2>d1, and the circumferential wall 42a from the bottom surface 41 to the opening 44 is an inclined surface.

(e) in FIG. 2 shows a cup-shaped member in which a folded portion 47 extended from the flange 46 toward the bottom surface 41 is additionally provided on the flange 46 shown in (b) in FIG. 2.

When the cup-shaped member 40 shown in (a) in FIG. 2 is disposed in the cylindrical housing 10, the bottom surface 41 is positioned on the side of the first end 12a and the annular enlarged diameter portion 45a of the enlarged diameter portion 45 of the opening 44 is abutted against the annular stepped surface 35. Thereby, a first gap 25 is formed between the circumferential wall 42 and the inner wall surface 11a of the cylindrical housing main body portion 11 which the circumferential wall 42 radially outwardly opposes. A width of the first gap 25 is as large as a difference between the outer diameter of the circumferential wall 42 and the annular enlarged diameter portion 45a of the enlarged diameter portion 45.

The combustion chamber 20 and the diffuser portion 30 are in communication with each other through the communication holes 43 via the first gap 25.

A cylindrical filter 50 is disposed in a space surrounded by the cup-shaped member 40 and the diffuser portion 30. In the cylindrical filter 50, a first end surface 52 is abutted against the bottom surface 41 of the cup-shaped member 40 and a second end surface 52 on the opposite side in the direction of the axis X is abutted against the closed end surface 32 of the diffuser portion 30.

In the cylindrical filter 50, an outer circumferential surface 53a of a circumferential wall 53 on the side of the first end surface 51 is abutted against the inner wall surface 42a of the circumferential wall 42 of the cup-shaped merrier 40. A second gap 37 is formed between the remaining outer circumferential surface 53a of the circumferential wall 53 on the side of the second end surface 52 and the circumferential wall 33 provided with the gas discharge ports 31 of the diffuser portion 30.

The cylindrical filter 50 is disposed such that a central axis of the cylindrical filter 50 is aligned with the axis X of the cylindrical housing 10.

The communication holes 43 of the cup-shaped member 40 are located to be closer to the first end surface 51 of the cylindrical filter 50 and to face the first gap 25. The gas discharge ports 31 of the diffuser portion 30 are formed to be closer to the second end surface 52 of the cylindrical filter 50.

With respect to an area (A1) where the circumferential wall 53 of the cylindrical filter 50 and the circumferential wall 42 of the cup-shaped member 40 are abutted against each other and an area (A2) where the circumferential wall 53 of the cylindrical filter 50 faces the second gap 37, A2 is approximately 70% when a total area of A1 and A2 is 100%.

A cylindrical support member 60 which is opened on the side of the first end 12a and closed on the side of the second end 12b is further disposed in the cylindrical housing main body portion 11.

The cylindrical support member 60 is used to define therein a filling space for accommodating a gas generating agent and to support the cup-shaped member 40 and the cylindrical filter 50 in the direction of the axis X. The cylindrical support member 60 may be omitted when the cup-shaped member 40 is fixed. Note that the filling space is also included in the combustion chamber. The cylindrical support member 60 is made of a metal such as stainless steel.

The cylindrical support member 60 has an outer diameter which is smaller than the inner diameter of the cylindrical housing main body portion 11, and a cylindrical gap 65 is formed between the cylindrical support member 60 and the cylindrical housing main body portion 11. In the cylindrical support member 60, a plurality of gas passage holes 63 are formed equidistantly in an axial direction and a circumferential direction on a circumferential wall 61. The filling space and the cylindrical gap 65 are in communication through the gas passage holes 63.

The cylindrical support member 60 has an enlarged diameter portion 66 at an opening on the side of the igniter 15, an outer circumferential edge 66a of the enlarged diameter portion 66 is abutted against the inner wall surface 11a of the cylindrical housing main body portion 11, and a closed end surface 62 is abutted against the bottom surface 41 of the cup-shaped member 40.

An outer diameter of the outer circumferential edge 66a is slightly larger than the inner diameter of the cylindrical housing main body portion 11, and when the cylindrical support member 60 is disposed in the cylindrical housing main body portion 11, the enlarged diameter portion 66 is press-fitted into the inner wall surface 11a of the cylindrical housing main body portion 11 due to elasticity of the enlarged diameter portion 66. When the enlarged diameter portion 66 is annularly formed, a gap does not occur in a press-fitted portion.

Figure 3:
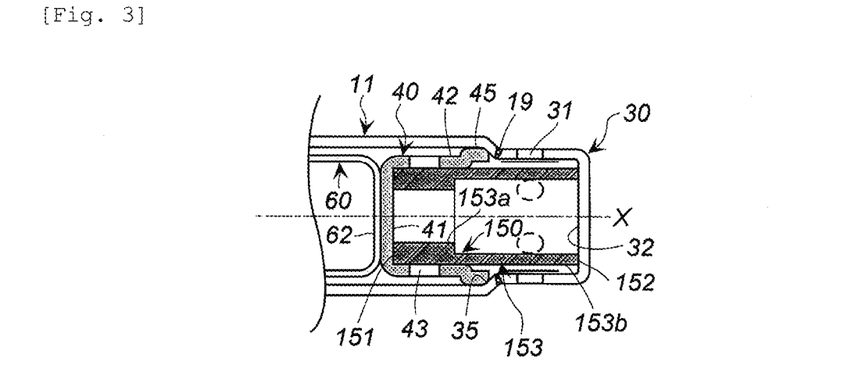
FIG. 3 shows a partial cross-sectional view in the direction of the axis X of a gas generator in which a cylindrical filter different from that shown in FIG. 1 is used.

In the gas generator 1 according to the present invention, a cylindrical filter 150 shown in FIG. 3 in place of the cylindrical filter 50 shown in FIG. 1 may be used. The cylindrical filter 150 includes a first end surface 151, a second end surface 152 and a circumferential wall 153, and the circumferential wall 153 includes a thicker-walled portion 153a on the side of the first end surface 151 and a thinner-walled portion 153b on the side of the second end surface 152.

An annular stepped surface is formed between the thicker-walled portion 153a and the thinner-walled portion 153b, but an inclined surface which is inclined from the thicker-walled portion 153a to the thinner-walled portion 153b may be formed instead.

The communication holes 43 of the cup-shaped member 40 faces only the thicker-walled portion 153a. Note that, as another embodiment, a thickness of the circumferential wall 153 of the cylindrical filter 150 may decrease from the first end surface 151 toward the second end surface 152.

An operation of the gas generator 1 shown in FIG. 1 will be described.

When the igniter 15 is actuated, the gas generating agent 21 inside the combustion chamber 20 is ignited and burned to generate a combustion gas. The combustion gas passes through the gas passage holes 63 of the cylindrical support member 60 and flows toward the second end 12b while flowing in and out of the cylindrical gap 65 and the filling space.

Subsequently, the combustion gas reaches the first gap 25, passes through the communication holes 43 and the cylindrical filter 50 in the part closer to the first end surface 51, enters the diffuser portion 30, once again passes through the cylindrical filter 50 and enters the second gap 37. In FIG. 1, an outer surface of the circumferential wall 53 on the side of the first end surface 51 of the cylindrical filter 50 is abutted against the inner wall surface 42a of the circumferential wall 42 provided with the communication holes 43 of the cup-shaped member 40. Thereby, almost an entire amount of the gas which passes through the communication holes 43 enters a space inside the cylindrical filter 50.

Subsequently, the combustion gas passes through the circumferential wall 53 of the cylindrical filter 50 on the side of the second end surface 52, ruptures the seal tape 34 and is discharged from the gas discharge ports 31.

Since the combustion gas passes through the single cylindrical filter 50 twice in this manner, a cooling effect and a filtering effect are enhanced as compared to the case in which the combustion gas passes through a filter once.

Further, compared to the case in which filters are separately disposed at a plurality of locations, an amount of filters is reduced and parts necessary for fixing the filters are omitted.

Furthermore, since the cylindrical filter 50 is disposed such that a central axis thereof is aligned in the direction of the axis X of the cylindrical housing main body portion 11, when the combustion gas makes a first passing, the combustion gas passes the part of the cylindrical filter 50 closer to the first end surface 51, and when the combustion gas makes a second passing, the combustion gas passes the part of the cylindrical filter 50 closer to the second end surface 52. As a result, an internal space of the cylindrical filter 50 functions as a space for collecting residues, blocking of gas due to clogging of the residues is less likely to occur compared to a solid columnar filter, and output performance stabilizes. Further, the second gap 37 allows the combustion gas to pass through wider region of the cylindrical filter 50. This advantageous effect is further enhanced by adjusting a range expressed by A2/(A1+A2)×100.

In addition, when the combustion gas enters the cylindrical filter 50, the combustion residues contained in the combustion gas adhere to irregularities of the inner wall surface of the cylindrical filter 50 and are more easily captured by the cylindrical filter 50.

(2) Gas Generator According to Embodiment 2

Gas generators 1A and 1B according to Embodiment 2 will be described with reference to (a) and (b) in FIG. 4. The gas generators 1A and 1B shown in (a) and (b) in FIG. 4 are the same as the gas generator 1 shown in FIG. 1 except for a shape of a filter.

Figure 4:
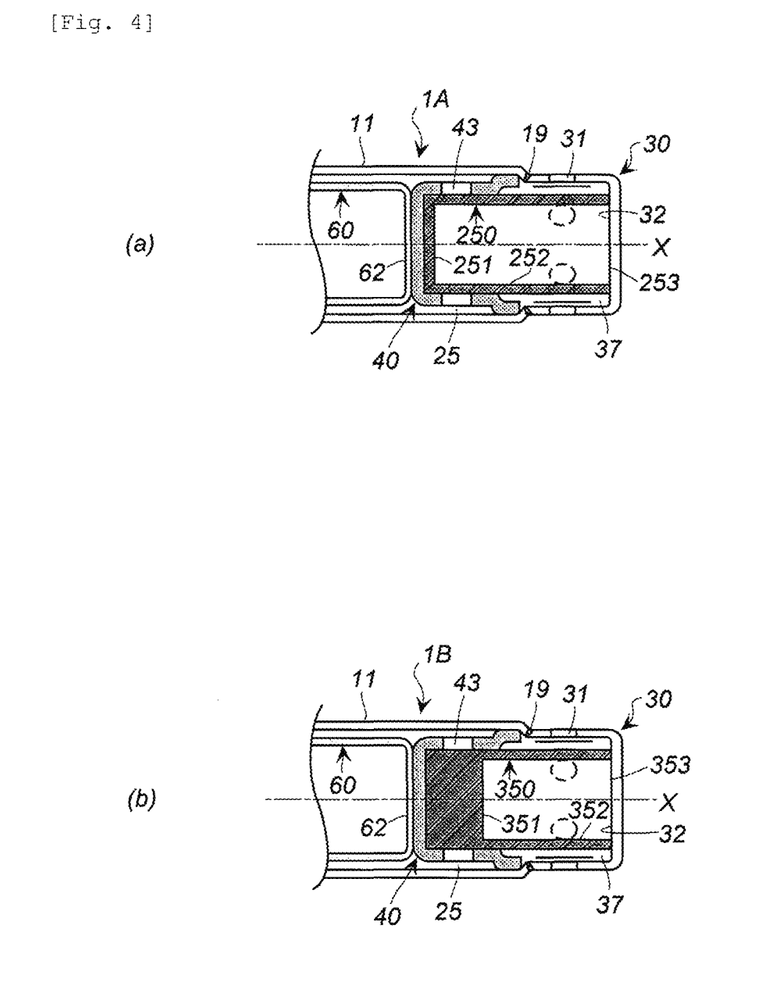

A cup-shaped filter 250 shown in (a) in FIG. 4 includes a bottom surface 251, a circumferential wall 252 and an opening 253. In the cup-shaped filter 250, the bottom surface 251 is abutted against the bottom surface 41 of the cup-shaped member 40 and an end surface of the opening 253 of the cup-shaped filter 250 is abutted against the closed end surface 32 of the diffuser portion 30.

The communication holes 43 of the cup-shaped member 40 are positioned to be closer to the bottom surface 251 of the cup-shaped filter 250 and to face the first gap 25. The gas discharge ports 31 of the diffuser portion 30 are formed closer to the opening 253 of the cup-shaped filter 250.

A mass of the cup-shaped filter 250 is greater than those of the cylindrical filter 50 shown in FIG. 1 and the cylindrical filter 150 shown in FIG. 3 by a mass of the bottom surface 251. However, the bottom surface 251 in the portion facing the inside of the diffuser portion 30 is an irregular surface and a surface area then increases, which enhances a combustion residue collecting effect.

A cup-shaped filter 350 shown in (b) in FIG. 4 includes a bottom surface 351, a circumferential wall 352 and an opening 353, and a thickness of the bottom surface 351 is greater than a thickness of the circumferential wall 352 and is greater than an inner diameter of the communication holes 43 of the cup-shaped member 40. In the cup-shaped filter 350, the bottom surface 351 is abutted against the bottom surface 41 of the cup-shaped member 40 and an end surface of the opening 353 of the cup-shaped filter 350 is abutted against the closed end surface 32 of the diffuser portion 30.

The cup-shaped filter 350 faces the communication holes 43 of the cup-shaped member 40 such that an intermediate position in the thickness of the bottom surface 351 matches a center of the communication holes 43 of the cup-shaped member 40. Thereby, all of the communication holes 43 face the bottom surface 351 and the combustion gas entering from the communication holes 43 inevitably proceeds radially inward through the bottom surface 351 of the cup-shaped filter 350, which enhances a cooling effect and a filtering effect.

Gas generators 1C, 1D, and 1E according to different embodiments will be described with reference to (a) to (c) in FIG. 5. The gas generators 1C, 1D, and 1E shown in (a) to (c) in FIG. 5 are the same as the gas generator 1 shown in FIG. 1 except that a diameter expansion inhibiting member for the cylindrical filter 50 is disposed therein.

Figure 5:
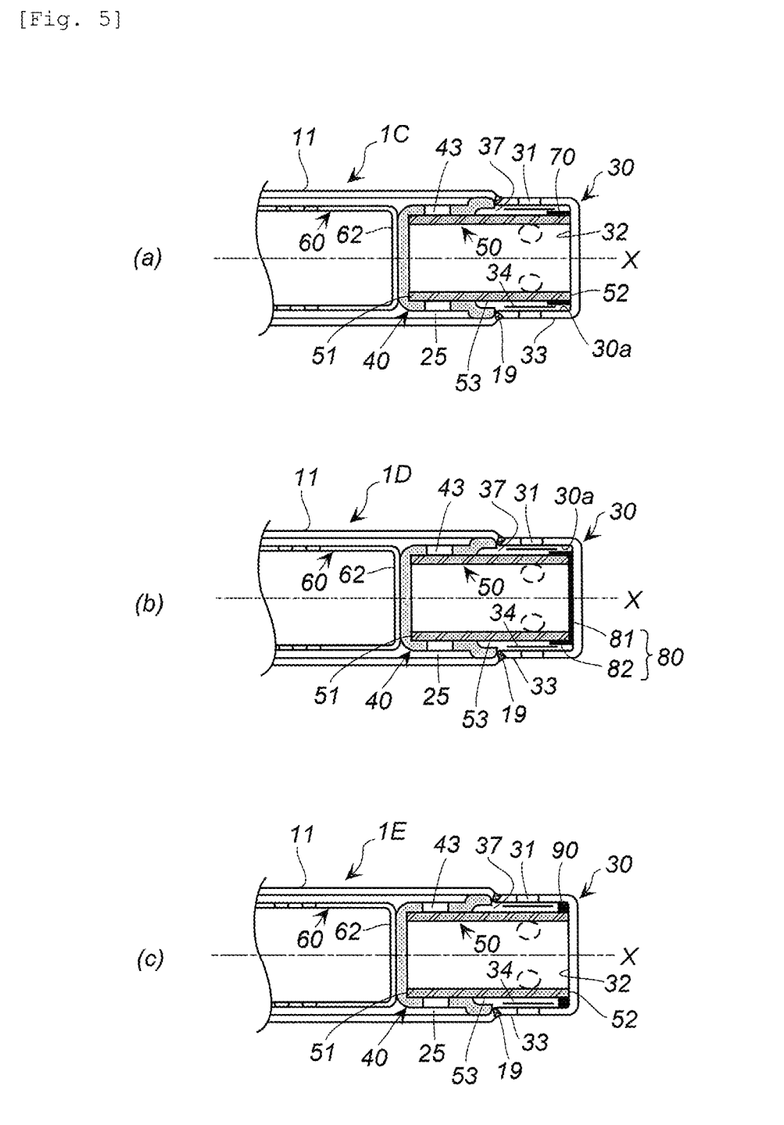

Note that, in the gas generators 1C, 1D, and 1E shown in (a) (c) in FIG. 5, the cylindrical filter shown in FIG. 3 or the cup-shaped filters shown in (a) and (b) in FIG. 4 can be used in place of the cylindrical filter 50.

In the gas generator 1C according to the embodiment shown in (a) in FIG. 5, an annular diameter expansion inhibiting member 70 is disposed between the circumferential wall 53 of the cylindrical filter 50 on the side of the second end surface 52 and the inner circumferential wall surface 30a of the diffuser portion 30 on the side of the closed end surface 32. In the annular diameter expansion inhibiting member 70, an inner circumferential surface thereof is abutted against the circumferential wall 53 of the cylindrical filter 50 and, from the perspective of avoiding interference with the seal tape 34, an outer circumferential surface thereof faces the circumferential wall 33 of the diffuser portion 30 at a slight distance.

In the gas generator in according to the embodiment shown in (b) in FIG. 5, a shallow cup-shaped diameter expansion inhibiting member 80 is disposed between the circumferential wall 53 of the cylindrical filter 50 on the side of the second end surface 52 and the inner circumferential wall surface 30a of the diffuser portion 30 on the side of the closed end surface 32. The cup-shaped diameter expansion inhibiting member 80 has a bottom surface 81 and a circumferential wall 82.

In the gas generator 1E according to the embodiment shown in (c) in FIG. 5, a diameter expansion inhibiting member 90 formed of a plurality of independent protrusions is disposed between the circumferential wall 53 of the cylindrical filter 50 on the side of the second end surface 52 and the inner circumferential wall surface 30a of the diffuser portion 30 on the side of the closed end surface 32.

In the gas generator 1E according to the embodiment shown in (c) in FIG. 5, a diameter expansion inhibiting member 90 formed of a plurality of independent protrusions is disposed between the circumferential wall 53 of the cylindrical filter 50 on the side of the second end surface 52 and a circumferential wall of the diffuser portion 30 on the side of the closed end surface 32.

The diameter expansion inhibiting member 90 formed of a plurality of independent protrusions protrudes inward from the circumferential wall 33 of the diffuser portion 30. A plurality (for example, 2 to 8) of the independent protrusions are formed equidistantly in a circumferential direction and are not in contact with the seal tape 34.

The diameter expansion inhibiting member 90 formed of a plurality of independent protrusions abuts against or faces at a slight gap the circumferential wall 53 of the cylindrical filter 50 on the side of the second end surface 52. Note that, the diameter expansion inhibiting member 90 may be formed of a continuous annular protrusion or a flange integrally formed on the cylindrical filter 50 on the side of the second end surface 52, instead of the plurality of independent protrusions.

With the arrangement of the diameter expansion inhibiting member 70, 80, and 90, the gas generators 1C, 1D, and 1E shown in (a) to (c) in FIG. 5 operate as follows.

A combustion gas which has passed through the cylindrical filter 50 from the communication holes 43 of the cup-shaped member 40 and then entered the diffuser portion 30 once again passes through the cylindrical filter 50, enters the second gap 37, subsequently ruptures the seal tape 34 and is discharged from the gas discharge ports 31, as described in the description of the operation of the gas generator shown in FIG. 1.

When the combustion gas passes through the cylindrical filter 50 for the second time and is discharged from the gas discharge ports 31, the cylindrical filter 50 on the side of the second end surface 52 may deform to expand radially outward under pressure generated during passage of the combustion gas, and thereby reducing the second gap 37. However, since the diameter expansion inhibiting member 70, 80, and 90 are disposed in the gas generators 1C, 1D, and 1E shown in (a) to (c) in FIG. 5, the cylindrical filter 50 on the side of the second end surface is prevented from deforming to expand radially outward, and thereby the second gap 37 is not reduced. Accordingly, a cooling effect and a filtering effect by the cylindrical filter 50 are fully exerted.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A gas generator, comprising:
a cylindrical housing including a cylindrical housing main body portion and a diffuser portion;
an ignition device being disposed at a first end of the cylindrical housing main body portion, the diffuser portion being provided with a gas discharge port and closing a second end thereof on an axially opposite side to the first end;

a combustion chamber which contains a gas generating agent being present in an internal space of the cylindrical housing main body portion;

a cup-shaped member partitioning the combustion chamber and the diffuser portion, the cup-shaped member having a bottom surface, a circumferential wall having a communication hole, and an opening, the cup-shaped member being disposed such that, the bottom surface is located on the side of the first end of the cylindrical housing main body portion, the opening is located on the side of the second end thereof, and the circumferential wall radially outwardly opposes an inner wall surface of the cylindrical housing main body portion to form therebetween a first gap communicating the combustion chamber with the diffuser portion, a cylindrical filter being disposed in a space surrounded by the cup-shaped member and the diffuser portion, the cylindrical filter being disposed such that a first end surface thereof is abutted against the bottom surface of the cup-shaped member, a second end surface thereof on the opposite side to the first end surface is abutted against a closed end surface of the diffuser portion and a central axis of the cylindrical filter is aligned with a long axis direction of the cylindrical housing, and the communication hole of the cup-shaped member being formed at a position closer to the first end surface of the cylindrical filter to face the first gap, and the gas discharge port of the diffuser portion being formed closer to the second end surface of the cylindrical filter.

2. The gas generator according to claim 1 wherein a circumferential wall of the cylindrical filter includes a thicker-walled portion on the side of the first end surface and a thinner-walled portion on a side of the second end surface, and only the thicker-walled portion faces the communication hole of the cup-shaped member.

3. The gas generator according to claim 1, wherein an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, and an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface.

4. The gas generator according to claim 3, wherein an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface, and with respect to an area (A1) where the circumferential wall of the cylindrical filter and the circumferential wall of the cup-shaped member are abutted against each other and an area (A2) where the circumferential wall of the cylindrical filter faces the second gap, A2 is in a range of more than 50% to 80% when a total area of A1 and A2 is 100%.

5. The gas generator according to claim 3, wherein an outer diameter of the cup-shaped member on the side of the opening is larger than an outer diameter of the bottom surface thereof, an annular stepped surface is formed on an inner wall surface of the cylindrical housing main body portion on the side of the diffuser portion, the end surface of the opening of the cup-shaped member is abutted against the annular stepped surface so as to form the first gap between the circumferential wall of the cup-shaped member having a communication hole and an inner wall surface of the cylindrical housing main body portion, an outer surface of the circumferential wall of the cylindrical filter on the side of the first end surface is abutted against an inner surface of the circumferential wall of the cup-shaped member having a communication hole, and a second gap is formed between the gas discharge port and an outer surface of the circumferential wall of the cylindrical filter on the side of the second end surface, and a diameter expansion inhibiting member is disposed between the circumferential wall of the cylindrical filter on the side of the second end surface and an inner circumferential wall surface of the diffuser portion on the side of a closed end surface, and the diameter expansion inhibiting member blocks a diameter expansion at the circumferential wall of the cylindrical filter on the side of the second end surface.

6. A gas generator, comprising:

a cylindrical housing including a cylindrical housing main body portion and a diffuser portion;

an ignition device being disposed at a first end of the cylindrical housing main body portion, a diffuser portion being provided with a gas discharge port and closing a second end thereof on an axially opposite side to the first end;

a combustion chamber which contains a gas generating agent being present in an internal space of the cylindrical housing main body portion;

a cup-shaped member partitioning the combustion chamber and the diffuser portion, the cup-shaped member having a bottom surface, a circumferential wall having a communication hole, and an opening, the cup-shaped member being disposed such that,
- the bottom surface is located on the side of the first end of the cylindrical housing main body portion,
- the opening is located on the side of the second end thereof, and
- the circumferential wall radially outwardly opposes an inner wall surface of the cylindrical housing main body portion to form therebetween a first gap communicating the combustion chamber with the diffuser portion, a cup-shaped filter having a bottom surface, a circumferential wall and an opening and being disposed in a space surrounded by the cup-shaped member and the diffuser portion, the cup-shaped filter being disposed such that the bottom surface of the cup-shaped filter is abutted against the bottom surface of the cup-shaped member, an end surface of the opening of the cup-shaped filter is abutted against a closed end surface of the diffuser portion and a central axis of the cup-shaped filter is aligned with a long axis direction of the cylindrical housing, and the communication hole of the cup-shaped member being formed at a position closer to the bottom surface of the cup-shaped filter to face the first gap, and the gas discharge port of the diffuser portion being formed closer to the opening of the cup-shaped filter.

7. The gas generator according to claim 6, wherein a thickness of the bottom surface of the cup-shaped filter is greater than a thickness of the circumferential wall of the cup-shaped filter and greater than an inner diameter of the communication hole of the cup-shaped member, and only the bottom surface of the cup-shaped filter faces the communication hole of the cup-shaped member.

8. The gas generator according to claim 6, wherein an outer diameter of the cup-shaped member is larger on the side of the opening than an outer diameter of the bottom surface thereof,
- an annular stepped surface is formed on an inner wall surface of the cylindrical housing main body portion on the side of the diffuser portion,
- the end surface of the opening of the cup-shaped member is abutted against the annular stepped surface so as to form the first gap between the circumferential wall of the cup-shaped member having a communication hole and an inner wall surface of the cylindrical housing main body portion, and
- an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening.

9. The gas generator according to claim 8, wherein an outer diameter of the cup-shaped member on the side of the opening is larger than an outer diameter of the bottom surface thereof,
- an annular stepped surface is formed on an inner wall surface of the cylindrical housing main body portion on the side of the diffuser portion,
- the end surface of the opening of the cup-shaped member is abutted against the annular stepped surface so as to form the first gap between the circumferential wall of the cup-shaped member having a communication hole and an inner wall surface of the cylindrical housing main body portion,
- an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening, and
- with respect to an area (A1) where the circumferential wall of the cup-shaped filter and the circumferential wall of the cup-shaped member are abutted against each other and an area (A2) where the circumferential wall of the cup-shaped filter faces the second gap, A2 is in a range of more than 50% to 80% when a total area of A1 and A2 is 100%.

10. The gas generator according to claim 8, wherein an outer diameter of the cup-shaped member on the side of the opening is larger than an outer diameter of the bottom surface thereof,
- an annular stepped surface is formed on an inner wall surface of the cylindrical housing main body portion on the side of the diffuser portion,
- the end surface of the opening of the cup-shaped member is abutted against the annular stepped surface so as to form the first gap between the circumferential wall of the cup-shaped member having a communication hole and an inner wall surface of the cylindrical housing main body portion,
- an outer surface of the circumferential wall of the cup-shaped filter on the side of the bottom surface is abutted against an inner surface of the circumferential wall of the cup-shaped member having a communication hole, and a second gap is formed between the gas discharge port and an outer surface of the circumferential wall of the cup-shaped filter on the side of the opening, and
- a diameter expansion inhibiting member is disposed between the circumferential wall of the cup-shaped filter on the side of the opening and an inner circumferential wall surface of the diffuser portion on the side of a closed end surface, and the diameter expansion inhibiting member blocks a diameter expansion at the circumferential wall of the cup-shaped filter on the side of the opening.

\* \* \* \* \*